US007646577B1

(12) United States Patent
Takeyoshi

(10) Patent No.: US 7,646,577 B1
(45) Date of Patent: Jan. 12, 2010

(54) POWER PLUGGING DEVICE WITH A FUNCTION OF RELEASING CHARGES FROM ELECTRIC SURGES

(76) Inventor: Ohara Takeyoshi, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 11/762,784

(22) Filed: Jun. 14, 2007

(51) Int. Cl.
*H02H 1/00* (2006.01)
*H02H 1/04* (2006.01)
*H02H 3/22* (2006.01)
*H02H 9/06* (2006.01)
*H01C 7/12* (2006.01)

(52) U.S. Cl. ........................ 361/120; 361/111; 361/118

(58) Field of Classification Search ................. 361/120, 361/111, 118
See application file for complete search history.

(56) References Cited

U.S. PATENT DOCUMENTS 6,430,018 B1 * 8/2002 Machida ..................... 361/120
6,549,388 B2 * 4/2003 Robinson .................... 361/111

* cited by examiner

*Primary Examiner*—Michael J Sherry
*Assistant Examiner*—Dharti H Patel

(57) ABSTRACT

A power plugging device with a function of releasing charges from electric surges serves for resolving problems caused by the switching surge generated by the electric system load switch, or the lightning surge generated directly or indirectly by the lightning. Accordingly, the damages of the electric appliances caused by electric pulses are avoided. A wrap layer forms between the plugging terminals. The wrap layer comprises a hollowed space. Furthermore, an electric discharging hole penetrates through the wrap layer from the hollowed space. Two terminals are mounted within the wrap layer and separated to each other for a certain distance. The tails of the two terminals are electrically connected to the plugging terminals respectively. While an instant high voltage/electric pulse generates, the terminals are used for point discharging. The hollowed space and the electric discharging hole form an electric discharging path for protecting the circuit.

4 Claims, 8 Drawing Sheets

POWER PLUGGING DEVICE WITH A FUNCTION OF RELEASING CHARGES FROM ELECTRIC SURGES

FIELD OF THE INVENTION

The present invention relates to a power plugging device, and more particularly to a power plugging device with a function of releasing charges from electric surges; the device has a hollowed space and a wrap layer formed between plugging terminals of the transformer, wherein the wrap layer together with the discharging terminals is capable of discharging the high-voltage electric pulse.

BACKGROUND OF THE INVENTION

The conventional surge protection technique applicable to electric products can be understood by referring to the Taiwan patent publication No. 518808 "Power Socket Module with a Surge Protection Circuit". It is characterized in that a surge protection circuit is installed in a power cord socket and electrically connected between two alternating current (AC) electrodes of the power cord socket in parallel. The surge protection circuit is used for eliminating the electric pulse between the two AC electrodes. The surge protection circuit is substantially described in the patent description and claims 4 and 5. A varistor and a fuse are connected between the two AC electrodes in serial. Wherein, when the voltage of the electric pulse exceeds a predetermined value, the varistor will conduct to eliminate the electric pulse. If the passing current of the varistor exceeds a predetermined value, the current fuse will fuse, or a light emitting diode will be off to indicate the damage of the surge protection circuit.

Another conventional surge protection device is described in the Taiwan patent publication No. M297037 "Lightening Strike Protector with a Protection Device". It is characterized in the lightening strike protection element and the point discharging module mentioned in the patent description and claim 1. When the pulse voltage is higher than the preset voltage of the point discharging module, the lightening protection element is activated.

Therefore, the principle of the above-mentioned two conventional surge protection techniques is substantially based on the existence of a core element: the varistor (or the lightening strike protection element). The varistor is capable of changing its resistance according to the voltage bridging over two ends of the element. According to such a principle, the resistance of the varistor is very high in a normal voltage. However, when the voltage increases to a certain value, the resistance will drop down rapidly in an extremely short time. In a general case, the response time is about several nanosecond (ns). Therefore, when the varistor is applied to the surge protection, it will be connected to the front end of the electric product in parallel. Consequently, when the normal operation voltage is supplied to the electric product, the varistor will be in an open-circuit state. However, when the voltage rises abnormally, the varirstor will be in a short-circuit state to abuse the energy in front of the electric product, so that the electric pulse cannot influence the electric product.

DETAILED DESCRIPTIONS OF THE INVENTION

Technical problems to be solved and the purpose of the present invention:

The primary object of the invention is to provide a power plugging device with a function of releasing charges from electric surges portion formed by a wrap layer having discharging terminals and a hollowed space between the plugging terminals of electric device such as a transformer or a charger. According to the electric discharging effect generated by the structure character of the wrap layer, the damage of the electric product caused by the electric pulse will be prevented.

The secondary object of the present invention is to form the surge protection elements directly on the portion of the power plugging device with a function of releasing charges from electric surges of an electric product in a small scale. Therefore, modules conforming to different plug types according to different areas such as the two-flat-blades type, the oblique-flat-blades type, etc. . . . , can be directly slid on the inner of the power plugging device with a function of releasing charges from electric surges.

The other object of the present invention is to enable slight variations on the design of the surge protection wrap layer in the structure of the hollowed space and the structure of the discharging electrodes according to different voltage-bearing specifications, so as to satisfy different using needs.

The effects of the present invention over the prior arts:

To achieve above object, the present invention provides that a power plugging device with a function of releasing charges from electric surges, mounted between plugging terminals of an electric appliance for discharging an electric pulse generated by a high voltage to prevent a damage of said electric appliance caused by said electric pulse, comprising: a component, having a predetermined indentation, mounted between and wrapping around said plugging terminals, wherein an electric discharging hole is form on said indentation; two terminals embedded within said component, separated apart with a distance from each other, wherein said two terminals corresponding to said plugging terminals respectively, and each of said terminals comprises a first end being opposite to a first end of the other terminal, and a second terminal electrically connected to a corresponding one of said plugging terminals; and a cover for coving over said component. A hollowed space is formed by covering said cover over said component to form an electric discharging path with said electric discharging hole while said electric pulse is generated and discharged by said terminals to prevent said damage of said electric appliance caused by said electric pulse.

Comparing the present invention to the prior arts, the original structure, which needs to connect the surge protection circuit to the power cord socket in parallel, is simplified. In other words, a complex wiring is avoided. Furthermore, a novel structure is disclosed, which provides on the power plugging device with a function of releasing charges from electric surges a wrap layer and discharging terminals having surge protection function so as to form a electric discharging path to prevent damages caused by the static electricity or the electric pulse.

DESCRIPTIONS OF PREFERRED EMBODIMENTS

Figure 1:
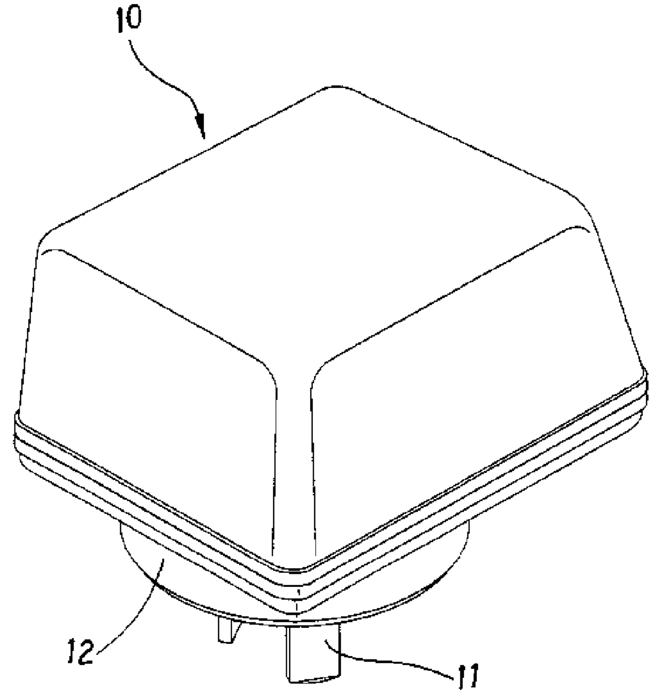
FIG. 1 is a perspective view schematically illustrating a first embodiment of the power plugging device with a function of releasing charges from electric surges according to the present invention.
Figure 6:
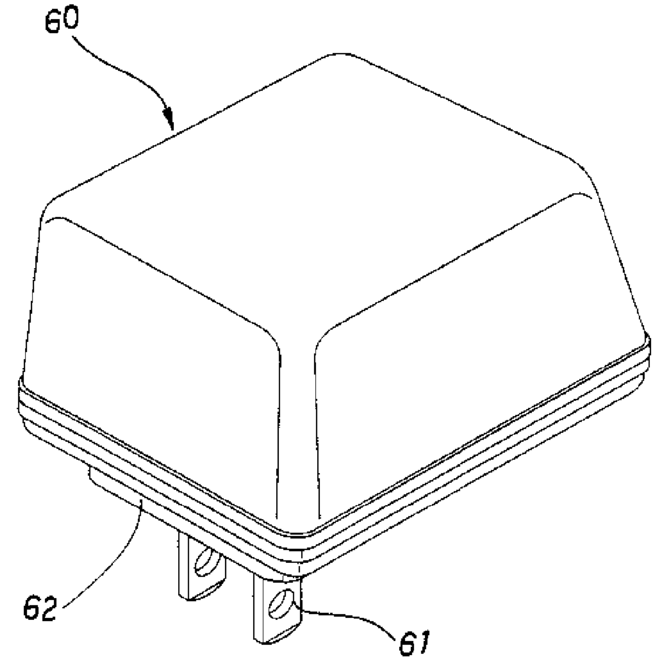
FIG. 6 is a perspective view schematically illustrating a second embodiment of the power plugging device with a function of releasing charges from electric surges according to the present invention.
Figure 7:
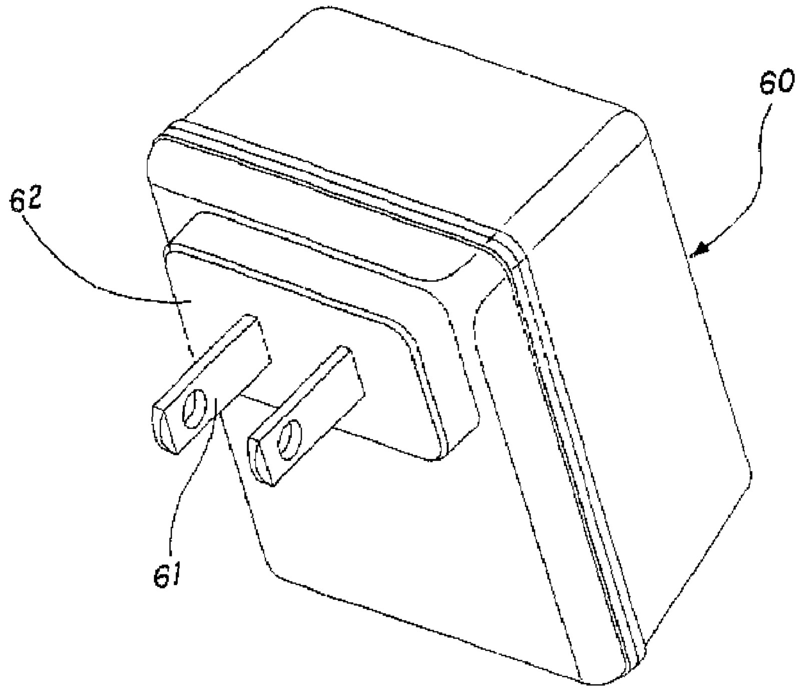
FIG. 7 is another aspect of the embodiment shown in FIG. 6.

FIGS. 1 and 6 illustrate the embodiments of the present invention applied to power plugging device with a function of releasing charges from electric surgess. Generally speaking, such power plugging device with a function of releasing charges from electric surgess 10, 60, e.g. transformers, are widely applied to various fields such as a power supply for a mobile phone charger. FIG. 1 illustrates oblique-flat-blades plugging terminals 11. The conventional two-flat-blade plugging terminal 61 is shown in FIG. 6. The preferred embodiments of the wrap layers according to the present invention described below are installed in the plugging terminals 11, 61 of the power plugging device with a function of releasing charges from electric surgess 10 and 60. They are embedded in the medium layers 12 and 62 shown in FIGS. 1 and 6 respectively, which can be observed in FIGS. 2 and 7 in different aspects. It can also be understood that in these embodiments, the wrap layers are not welded on the circuit board of the original power plugging device with a function of releasing charges from electric surgess (transformers). Instead, they are installed on the housing of the internal medium layers 12 and 62 of the plugging ends 10 and 60 directly to be stand-along units, respectively. The applications of the present invention can be applied on normal power plugs. It is only has to find another suitable space and the principles are the same.

Figure 2:
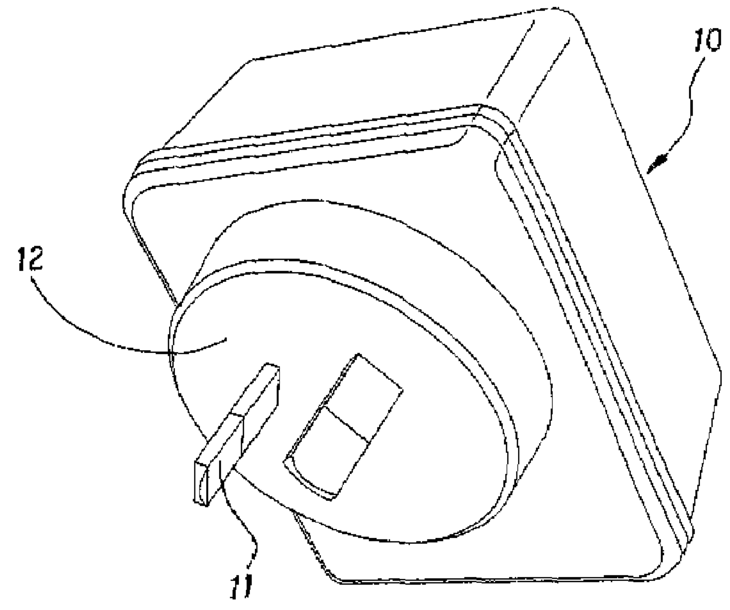
FIG. 2 is another aspect of the embodiment shown in FIG. 1.
Figure 3:
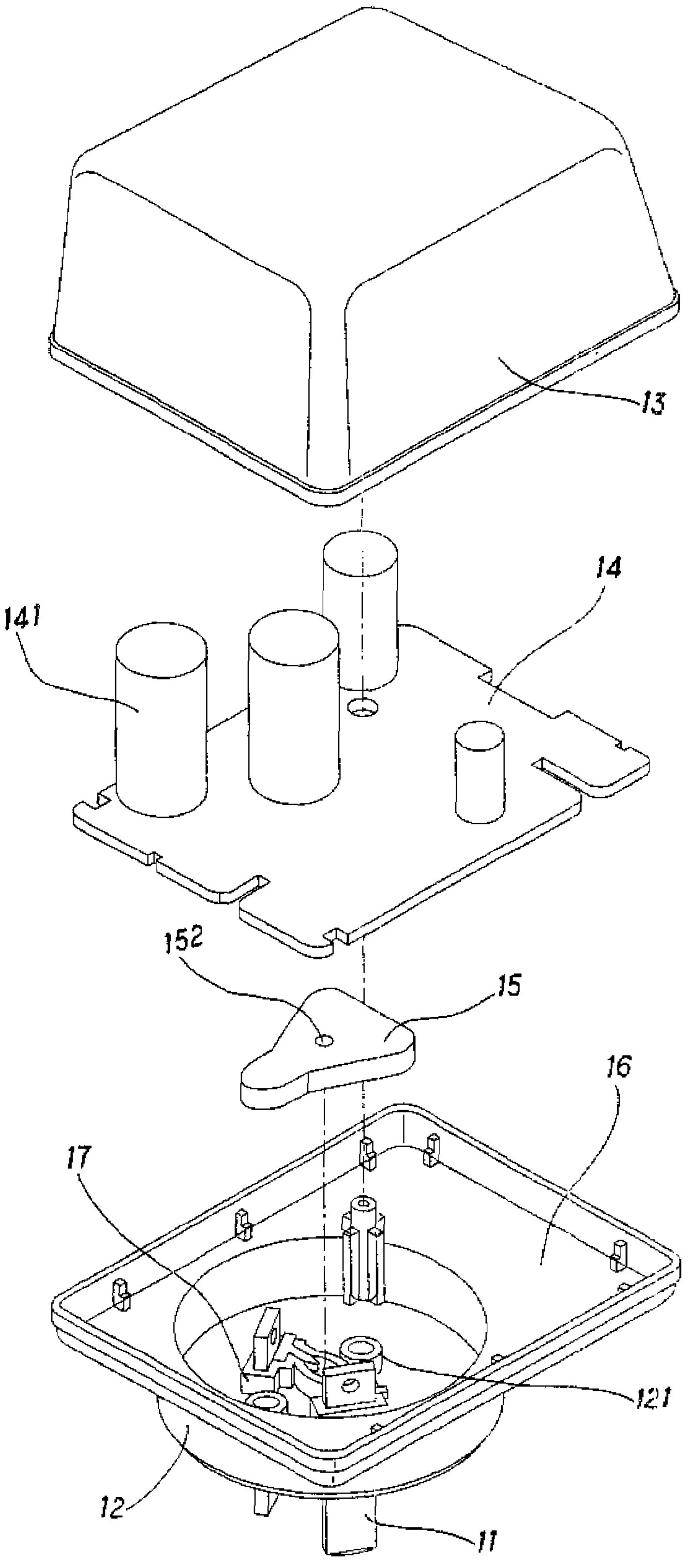
FIG. 3 is an exploded view of the first embodiment.
Figure 4:
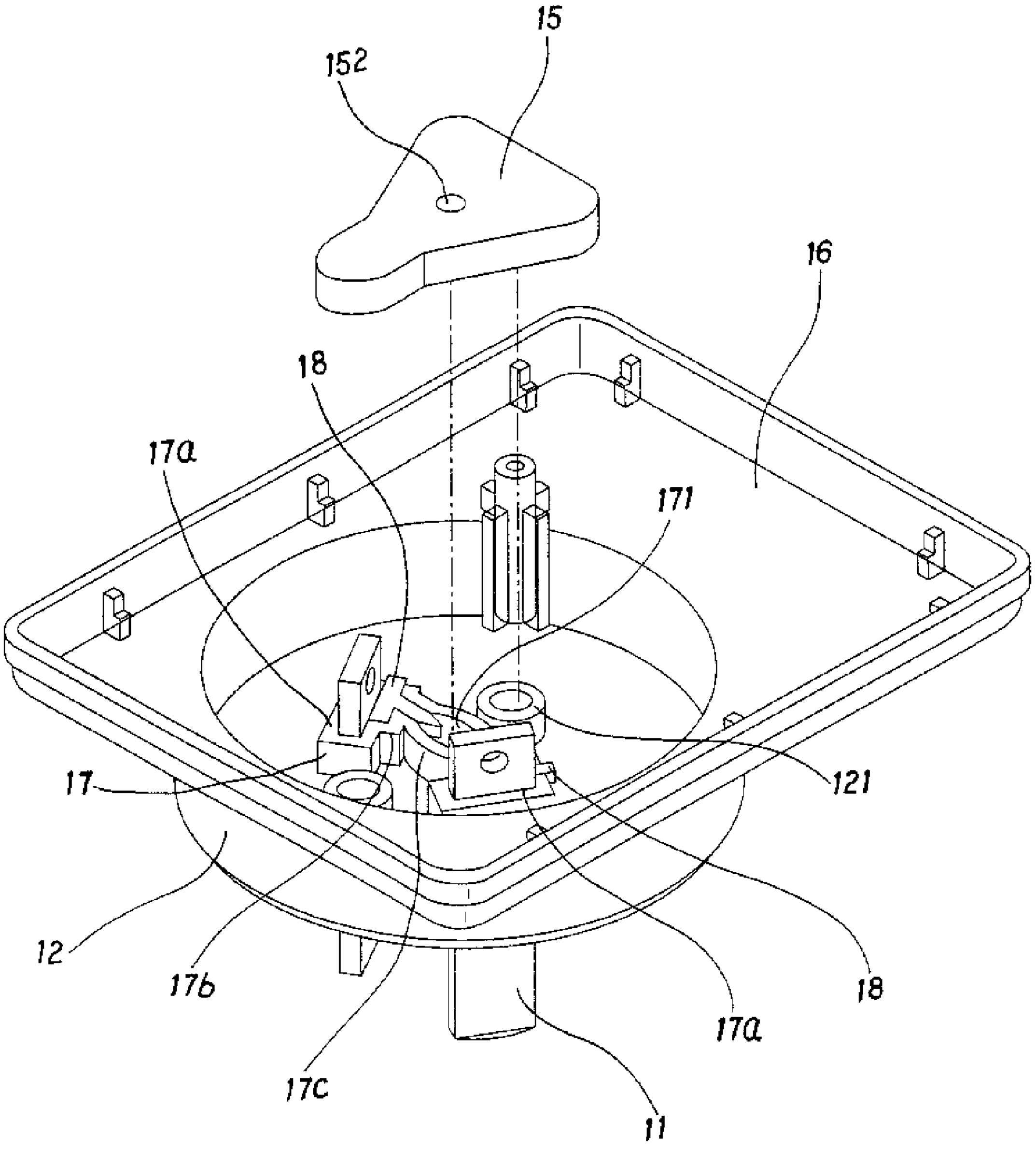
FIG. 4 is an exploded view of a partial structure of the first embodiment.
Figure 5:
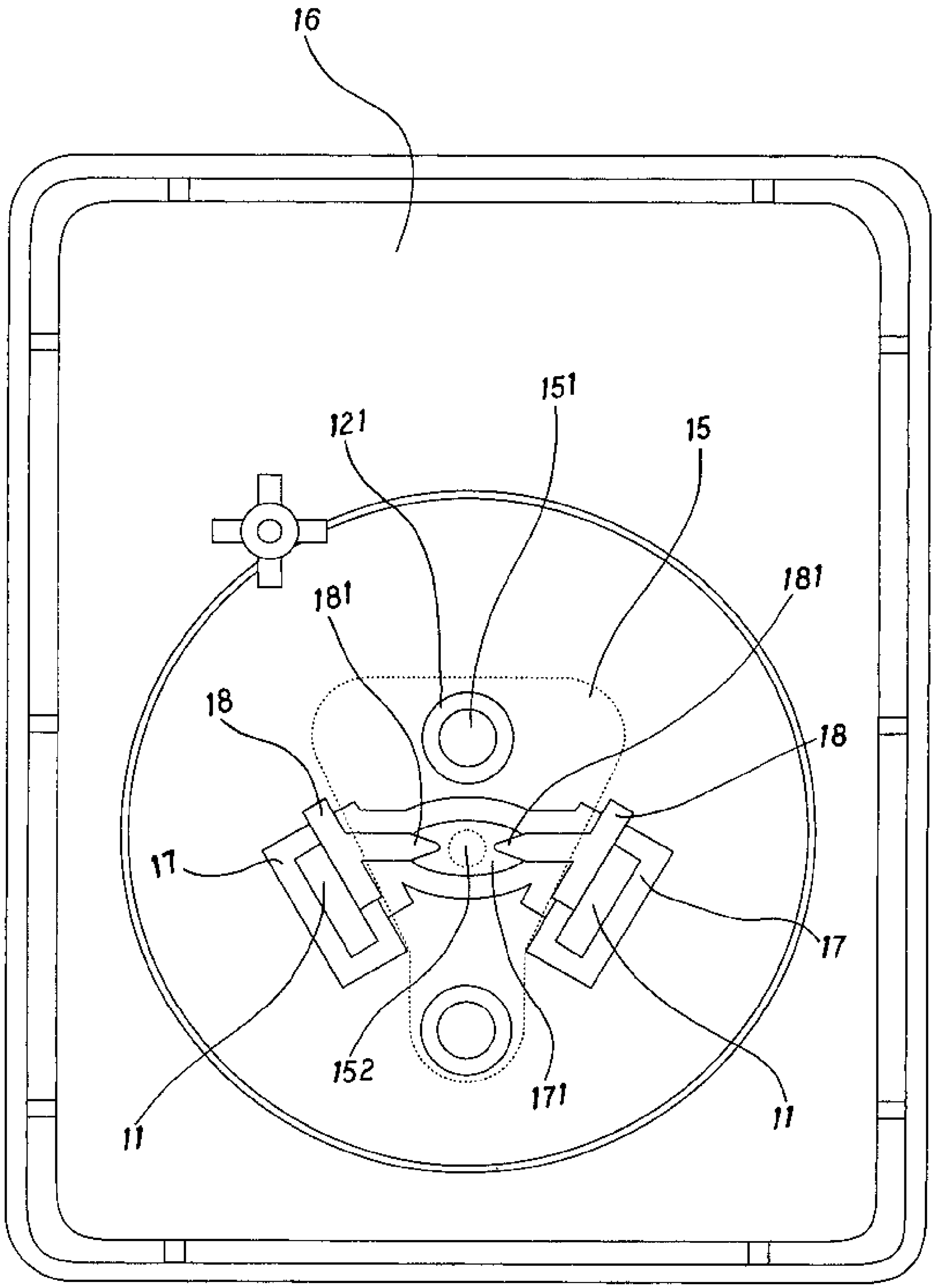
FIG. 5 is a perspective view of a partial combined structure of the first embodiment.

FIG. 1 illustrates the first embodiment of the present invention, FIG. 2 illustrates the first embodiment in another aspect, FIG. 3 is an exploded view of the first embodiment, FIG. 4 is a partial exploded view of the first embodiment, and FIG. 5 illustrates a partial combined structure of the first embodiment. Disassemble the power plugging device with a function of releasing charges from electric surges 10 of the embodiment shown in FIG. 1 will obtain the exploded view of the power plugging device with a function of releasing charges from electric surges 10 as shown in FIG. 3. In this embodiment, the type of the plugging terminals 11 is oblique-flat-blade. A power plugging device with a function of releasing charges from electric surges of this type comprises a housing 13, a circuit board 14 having a plurality of electric elements 141 and being inlaid into the housing 13, and a cover 15 propping up the circuit board 14 and covering the medium layer 12 formed with the base 16. The cover 15 also collocates with the component 17 mounted on the power plug 11 to form the wrap layer having a hollowed space.

FIG. 4 is a partial exploded view for a better understanding to the embodiment. The wrap layer formed in the medium layer 12 is constructed by a cover 15 and a component 17 having a predetermined indentation 171. The shape of the cover 15 of the present invention is similar to a triangle so as to match the design of the oblique-flat-blades type plugging terminals 11. It is known from FIG. 5 that the cover 15 comprises a tenon 151 which can be aligned to and buckled with the plugging aperture 121 installed in the medium layer 12. Accordingly, the cover 15 lays over the component 17 to form a so-called wrap layer. The component 17 has a predetermined inner/outer shape and an indentation 171. Accordingly, the plugging terminals 11 and the terminals 18 are wrapped within the component 17. The cover 15 further comprises an electric discharging hole 152 aligning to the center of the indentation 171.

To understand the present invention better, a more detailed description about the component 17 is necessary. The component 17 can be divided as three areas. The first area 17*a* of the component 17 is a portion used for receiving the plugging terminals 11. A symmetric second area 17*b* of the component 17 is located next to the first area 17*a*, which is a portion for receiving the terminals 18 and allows the terminals 18 to be electrically connected with the plugging terminals 11. For a circuit designing, such an arrangement is to connect a high-voltage discharging element in parallel. The third area 17*c* comprises an indentation 171, wherein discharging tips 181 of the terminals 18 are exposing from the indentation 171 and opposite to each other for a certain distance. The terminals 18 are naked within the indentation 171 and are capable of executing a point discharging while a spike occurs. The distance between the two discharging tips 181 should not exceed the diameter of the indentation 171. The structure and shape of the indentation 171 can be diversified as needed. Generally, it can be divided as arc-shaped or rectangle-shaped, just according to different voltage-bearing abilities. Furthermore, the component can be designed by following the safety regulations to meet the requirement of the structure examination of the surge protectors and the related safety tests about the electric products. A further explanation about this portion will be described later.

FIG. 5 is a top view of the above-mentioned wrap layer according to the present invention. To put the cover 15 over the component 17 is to cap the indentation 171 such that the third area 17*c* of the component 17, i.e. the indentation 171 forms a hollowed space when being capped by the cover 15. The electric discharging hole 152 of the cover 15 aims at the center of the indentation 171. Therefore, when the electric pulse generated at the outside enters the terminals 18 from the plugging terminals 11 and is discharged by the discharging tips 181 of the terminals 18, the hollowed space and the electric discharging hole 152 form an electric discharging path, and eliminate the electric pulse in the front circuit of the electric product. Therefore, the damages of the product caused by the static electricity and the electric pulse are prevented.

The principle of the present invention is that in the affection of a strong electric field, the bigger the curvature of an object surface is, the higher is the density of the electric potential. On the tip of a sharp-pointed or a tiny object, the intensity of the electric field increase violently and thus the nearby air is ionized to generate a gas discharging. The gas discharging phenomenon generates on air around the discharging tips. Therefore, except for a sufficient high voltage, there must be a suitable surface configuration to generate the point discharging phenomenon. For example, the inner surface of the hollowed space of the present invention forms a short circuit under a sudden-raised voltage, and the electric charges are released through the electric discharging hole 152.

There are three variable factors for forming the wrap layer disclosed by the present invention:

1. The hollowed space constructed by the cover and the component is allowed to be rectangle-shaped or are-shaped;

2. The front discharging portions of the terminals are allowed to be rectangle-shaped or an pointed end; and 3. The distance between the discharging tips are adjustable. The primary technique character of the present invention is to provide a wrap layer in which the discharging terminals are combined with the plugging terminals. When a high-voltage electric pulse generates, an electric discharging path forms among the inner surface of the hollowed space, the electric discharging hole, and the surrounding to drain the high-voltage electricity generated by the electric pulse.

Figure 8:
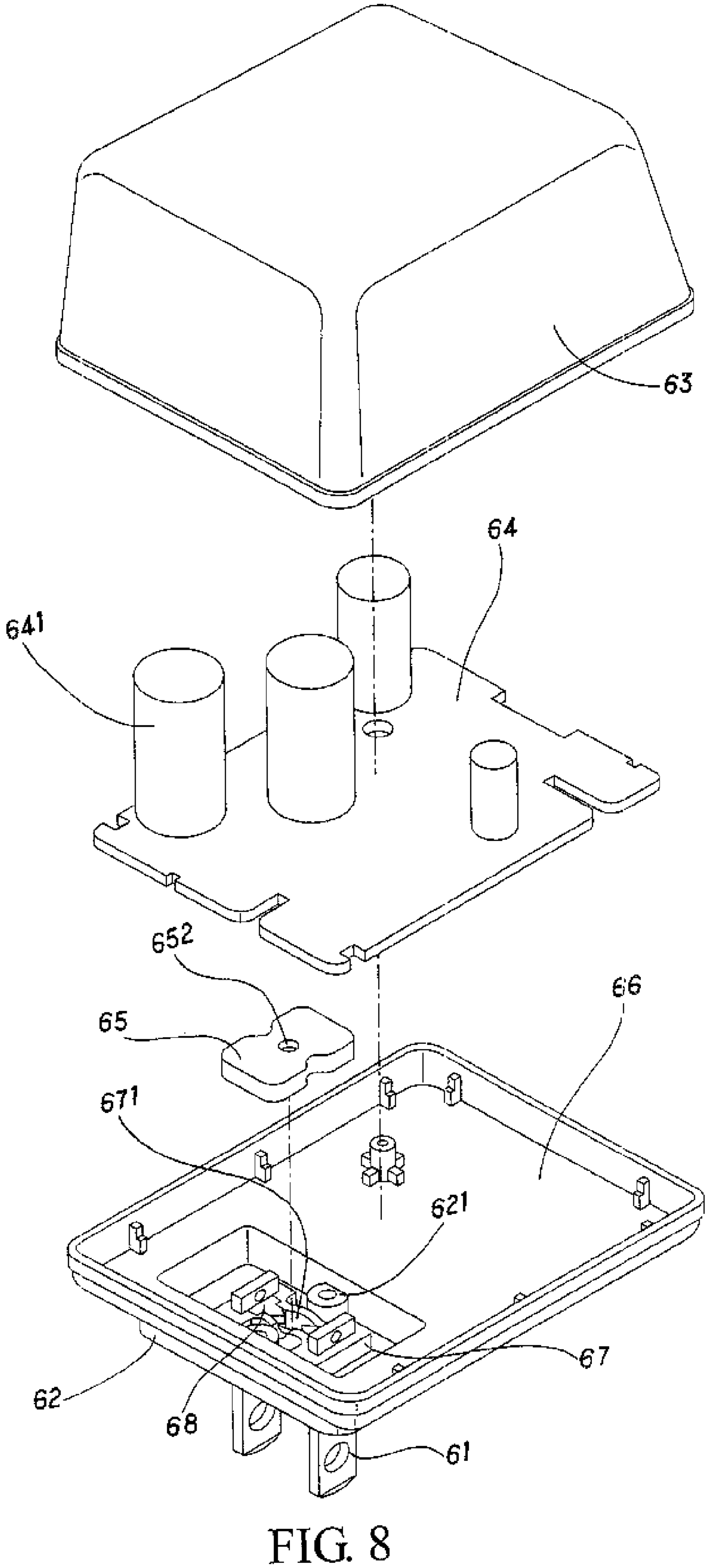
FIG. 8 is an exploded view of the second embodiment.
Figure 9:
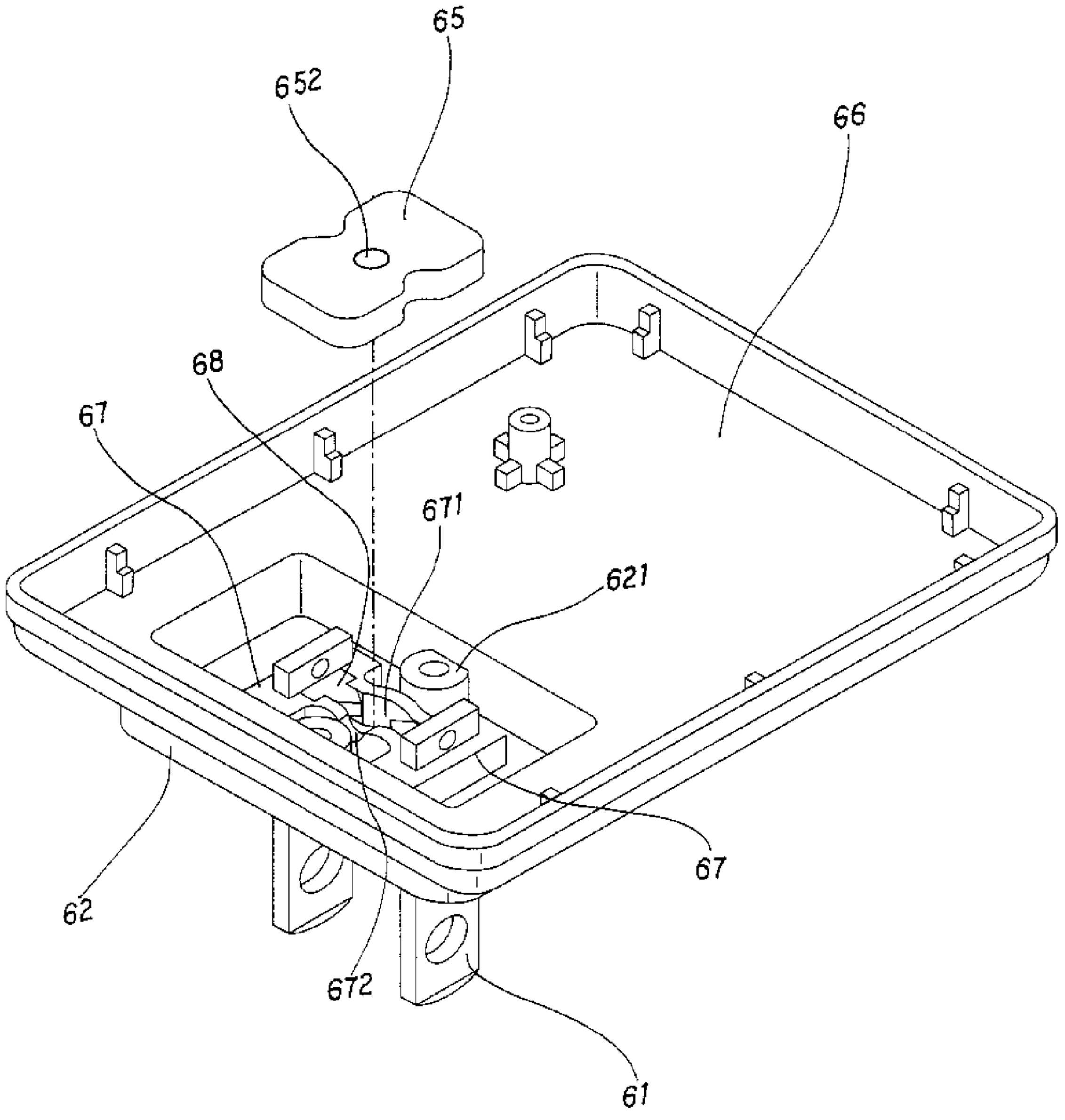
FIG. 9 is an exploded view of a partial structure of the second embodiment.

Further referring to FIG. 6, which illustrates a second embodiment of the present invention. While describing the present embodiment, please also refer to FIG. 7, which is another aspect of the embodiment shown in FIG. 6; FIG. 8, which is an exploded view; FIG. 9, which is a partial exploded view; and FIG. 10, which is a partial combination view of this embodiment. Disassemble the power plugging device with a function of releasing charges from electric surges 60 of the embodiment shown in FIG. 6 will obtain the exploded view of the power plugging device with a function of releasing charges from electric surges 60 as shown in FIG. 8. The plug type of this embodiment is the type of common two-flat-blades plugging terminals 61 well used in Taiwan. Similar to the first embodiment, the power plugging device with a function of releasing charges from electric surges is constructed by a housing 63; a circuit board 64 having a plurality of electric elements 641 inlayed within the housing 63; and a cover 65 propping up against the circuit board 64 and covering over the medium layer 62 formed by the base 66. The cover 65 also collocates with the component 67 mounted on the plugging terminals 61 to form the wrap layer having a hollowed space and an electric discharging hole 652.

Different from the first embodiment, the type of plugging terminals 61 of the present invention is a two-flat-blades type. As shown in FIG. 9, the wrap layer formed by the inner wall of the medium layer 62 is constructed by a cover 65 and a component 67 having a predetermined indentation 671. The cover 65 of the second embodiment is rectangular so as to match up with the design of the two-flat-blades type plugging terminals 61. It is known from FIG. 10 that the cover 65 comprises a tenon 651 which can be aligned to and buckled with the plugging aperture 621 installed on the medium layer 62. Accordingly, the cover 65 lays over the component 67 to form a so-called wrap layer. The component 67 has a predetermined outer shape and an indentation 671. Accordingly, the plugging terminals 61 and the terminals 68 are wrapped within the component 67. The component 67 has thereon an electric discharging hole 672.

It is observed that the electric discharging holes of the two embodiments are respectively disposed on the different locations, the cover and the component. Such different arrangements indicate that the electric discharging hole can be disposed on anywhere in the hollowed space to obtain the effect of eliminating the electric pulse. Furthermore, the design of the component of the present embodiment is similar to that of the first embodiment but only different in the appearances, and thus will not be repeatedly described here.

Figure 10:
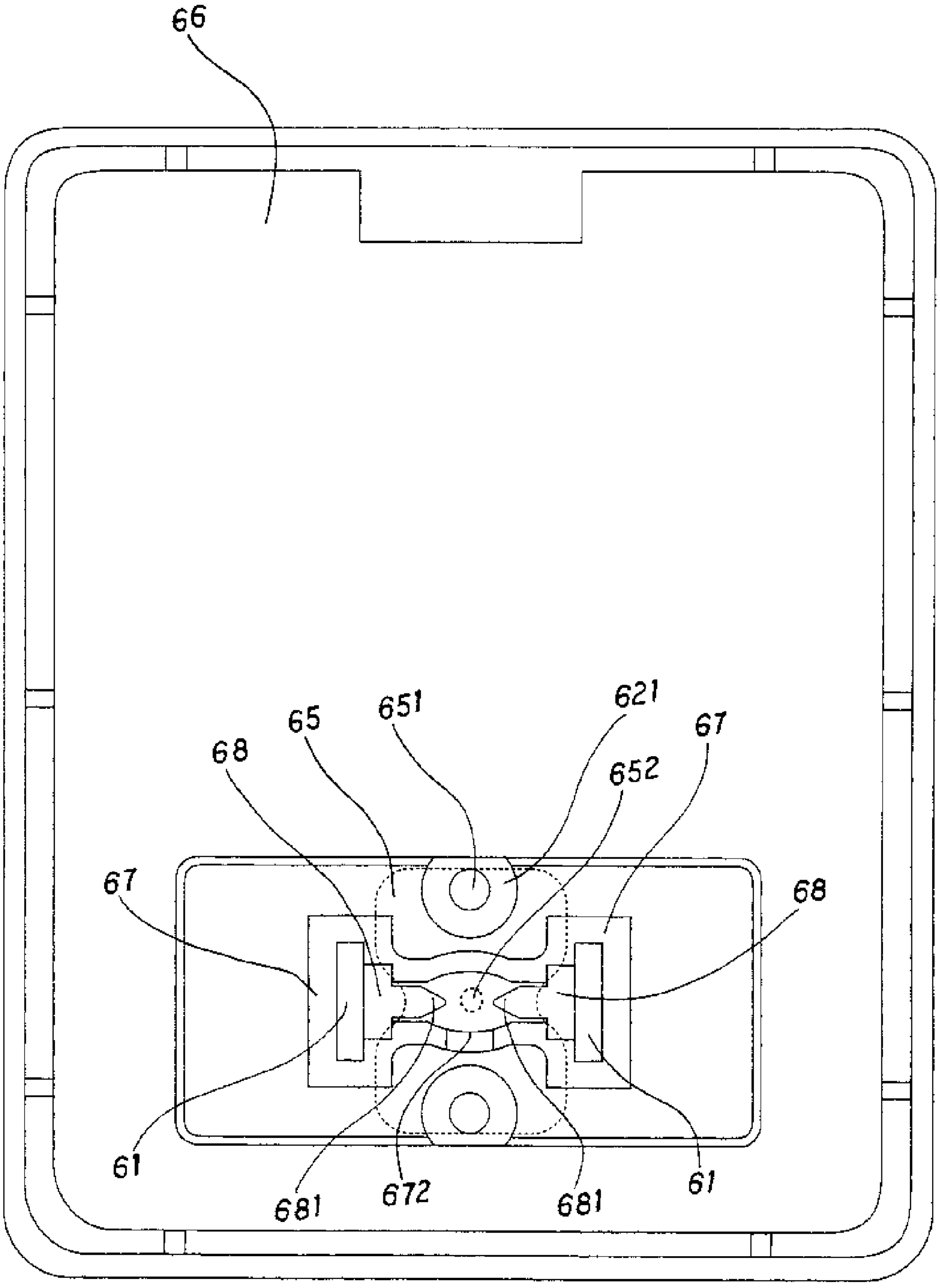
FIG. 10 is a perspective view of a partial combined structure of the second embodiment.

Therefore, by referring to FIG. 10, it is clear that the purpose of covering the cover over the component 67 is to cover the indentation 671 so as to form a hollowed space by the component 67 covered by the cover 65, and an electric discharging hole 652. The electric discharging hole 672 will form on the edge where the component 67 and the cover 65 contact. Therefore, when the electric pulse generated at the outside enters the terminals 68 from the plugging terminals 61 and is discharged by the discharging tips 681 of the terminals 68, the hollowed space and the electric discharging hole 672 form another electric discharging path, and eliminate the electric pulse in the front circuit of the electric product. Therefore, the damages of the product caused by the static electricity and the electric pulse are prevented.

DESCRIPTIONS OF PRIMARY ELEMENTS

| | |
|---|---|
| 10 power plugging device with a function of releasing charges from electric surges | 11 plugging terminals |
| 12 medium layer | 121 plugging aperture |
| 13 housing | 14 circuit board |
| 141 electric element | 15 cover |
| 151 tenon | 152 electric discharging hole |
| 16 base | 17 component |
| 17a first area | 17b second area |
| 17c third area | 171 indentation |
| 18 terminal | 181 discharging tip |
| 60 power plugging device with a function of releasing charges from electric surges | 61 plugging terminals |
| 62 medium layer | 621 plugging aperture |
| 63 housing | 64 circuit board |
| 641 electric element | 65 cover |
| 651 tenon | 652 electric discharging hole |
| 66 base | 67 component |
| 671 indentation | 672 electric discharging hole |
| 68 terminal | 681 discharging tip |

What is claimed is:

1. A power plugging device for releasing charges from electric surges comprising a housing (13);

a circuit board (14) having a plurality of electric elements (141) and being inlaid into the housing (13);

a medium layer (12) formed with a base (16); the medium layer (12) being formed with a plugging aperture (121);

a receiving component (17) formed in the medium layer (12); and the receiving component (17) having a predetermined indentation (171);

a pair of the oblique-flat-blade plugging terminals (11) extended from a lower side of the medium layer (12); upper ends of the plugging terminals (11) being wrapped within the receiving component (17);

a pair of oblique-flat-blade terminal ends (18) being received in the receiving component (17); each terminal end (18) having a discharging tip (181); the two discharging tips (181) being arranged so that the two discharging tips (181) point to one another;

a cover (15) propping up the circuit board (14) and covering the medium layer (12) formed with the base (16); a shape of the cover (15) being similar to a triangle so as to match the design of the oblique-flat-blades type plugging terminals (11); the cover (15) comprising a tenon (151) which can be aligned to and buckled with the plugging aperture (121) of the medium layer (12); the cover (15) having an electric discharging hole (152) at center portion thereof;

wherein the cover (15) covers upon the receiving component (17); the electric discharging hole (152) of the cover (15) is aligning to the center of the indentation (171);

wherein the receiving component (17) includes three areas; a first area (17*a*) serves for receiving the plugging terminals (11); a symmetric second area is located next to the first area (17*a*) for receiving the end portions (18) and allowing the terminal ends (18) to be electrically connected with the plugging terminals (11); a third area (17*c*) is formed with the indentation (171); and wherein discharging tips (181) of the terminals (18) exposes from the indentation (171) and opposite to each other for a certain distance; and the terminals (18) being naked within the indentation (171) and being capable of executing a point discharging while a spike occurs.

2. The power plugging device as claimed in claim 1, wherein the indentation (171) has an arc-shaped.

3. The power plugging device as claimed in claim 1, wherein the indentation (171) has a rectangle-shaped.

4. A power plugging device for releasing charges from electric surges comprising a housing (63);

a circuit board (64) having a plurality of electric elements (641) and being inlaid into the housing (63);

a medium layer (62) formed with a base (66); the medium layer (62) being formed with a plugging aperture (621);

two-flat-blades type plugging terminals (61) extended from a lower side of the medium layer (62); upper ends of the plugging terminals (61) being wrapped within the receiving component (17);

a pair of terminal ends (68) being receiving into the receiving components (67); each terminal end (68) having a discharging tip (681); the two discharging tips (681) being arranged so that the two discharging tips 681 point to one another;

a cover (65) matching up with the design of the two-flat-blades type plugging terminals (61) and comprising a tenon (651) which can be aligned to and buckled with the plugging aperture (621) installed on the medium layer (62);

a plugging aperture (621) in the medium layer (62) and arranged aside the receiving component (67) for receiving the tenon (651) of the cover (65)

a receiving component (67) has an indentation (671) and an electric discharging hole (672); the plugging terminals (61) and the terminals ends (68) being wrapped within the receiving component (67) so that the terminal ends (68) being electrically conductive to the plugging terminals (61); the electric discharging hole (672) forming on the edge where the receiving component (67) and the cover (65) contact; and wherein the cover (65) covering over the receiving component (67) is to cover the indentation (671) to form a hollowed space; the terminal ends (68) being naked within the indentation (671) and being capable of executing a point discharging while a spike occurs.

* * * * *